Feb. 26, 1963   R. Q. WINTERS   3,078,716
LIQUID LEVEL CONTROLLER

Filed Dec. 9, 1959   2 Sheets-Sheet 1

INVENTOR.
Richard Q. Winters
BY
C. M. McKnight

Feb. 26, 1963 R. Q. WINTERS 3,078,716
LIQUID LEVEL CONTROLLER
Filed Dec. 9, 1959 2 Sheets-Sheet 2
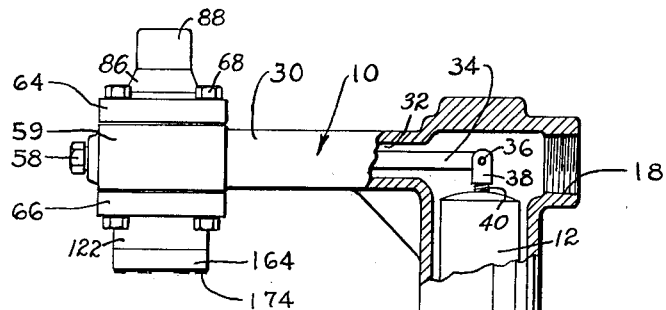
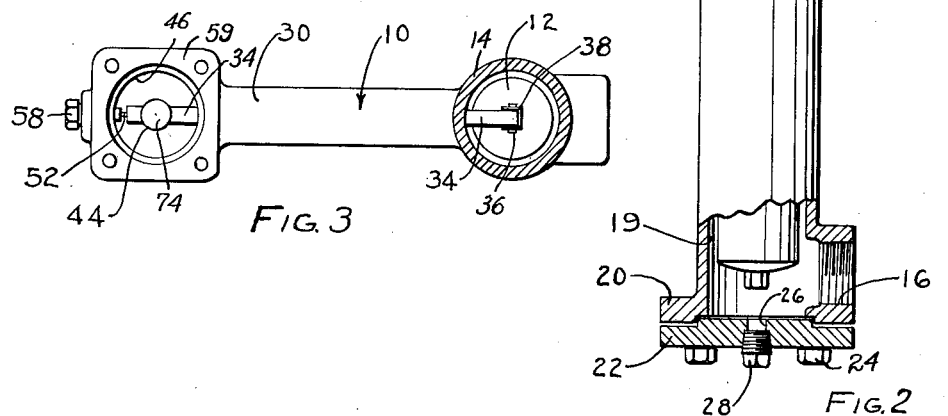
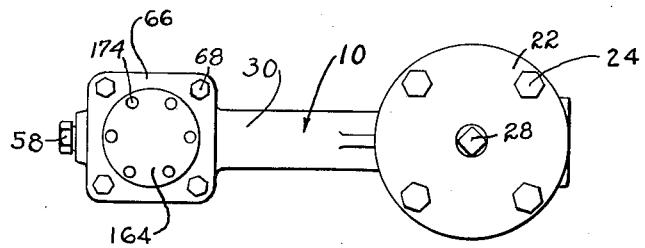
INVENTOR.
Richard Q. Winters
BY
C. M. McKnight

United States Patent Office 3,078,716
Patented Feb. 26, 1963

3,078,716
LIQUID LEVEL CONTROLLER
Richard Q. Winters, 1214 E. 17th Place, Tulsa, Okla.
Filed Dec. 9, 1959, Ser. No. 858,513
8 Claims. (Cl. 73—317)

This invention relates to improvements in liquid level controllers, and more particularly, but not by way of limitation, to a displacement type liquid level control wherein the weight change of the displacement element is transmitted to a controlling device.

Torsion tube type level controllers, such as disclosed in the L. J. Griffey Patent No. 2,542,769, issued February 20, 1951, and entitled "Motion Transmitting Device," have been developed for eliminating the necessity of stuffing glands and the attendant friction which is imposed to seal a shaft in other types of liquid level controllers. These torsion tube level controllers normally transmit the linear movement of a float arm to rotational motion in a torsion shaft, which in turn usually transmits linear motion to a pilot valve unit for controlling the admission or discharge of fluid. The present invention contemplates an improvement over the torsion tube level controllers available today by the utilization of a balancing beam in lieu of a torsion tube, thereby eliminating translation of linear motion to rotational motion. A dual balanced seal unit is carried by the balance beam for actuation of an air relay valve whereby equal areas of the seal unit are open to the pressure surrounding the beam. Thus, pressure changes within the vessel due to temperature variations, and the like, will not disturb the balance of the system. The force balancing principle utilized with the beam requires very little motion of the sealing unit for actuation of the air relay valve. The entire level controller unit is of a compact and simple structure which provides for an economy of manufacture as well as an efficiency of operation.

It is an important object of this invention to provide a liquid level controller wherein stuffing glands, and the like, and the attendant friction, are eliminated.

It is another object of this invention to provide a novel liquid level controller wherein a force balance principle is applied to a balance beam for a more efficient level control.

Another object of this invention is to provide a novel liquid level controller wherein pressure changes within the unit will not affect the balance of the system.

Still another object of this invention is to provide a novel liquid level controller particularly designed and constructed whereby very little movement of the sealing unit is required for actuation of the air relay valve.

It is a further object of this invention to provide a novel liquid level controller wherein the forces on the balance beam remain in the same direction at all times, thus closing any slack which may exist in the fit between the various component parts of the device in order that the dependability of the unit will not be affected thereby.

A still further object of this invention is to provide a novel liquid level controller unit which is simple and efficient in operation and economical and durable in construction.

Other objects and advantages of the invention will be evident from the following detailed description, read in conjunction with the accompanying drawings, which illustrate my invention.

In the drawings:

FIGURE 2 is an elevational view partly in section of a level controller embodying the invention.

FIGURE 3 is a top plan view of the level controller apparatus with portions thereof omitted for purposes of illustration.

FIGURE 4 is a bottom plan view of the novel liquid level controller apparatus.

Figure 1:
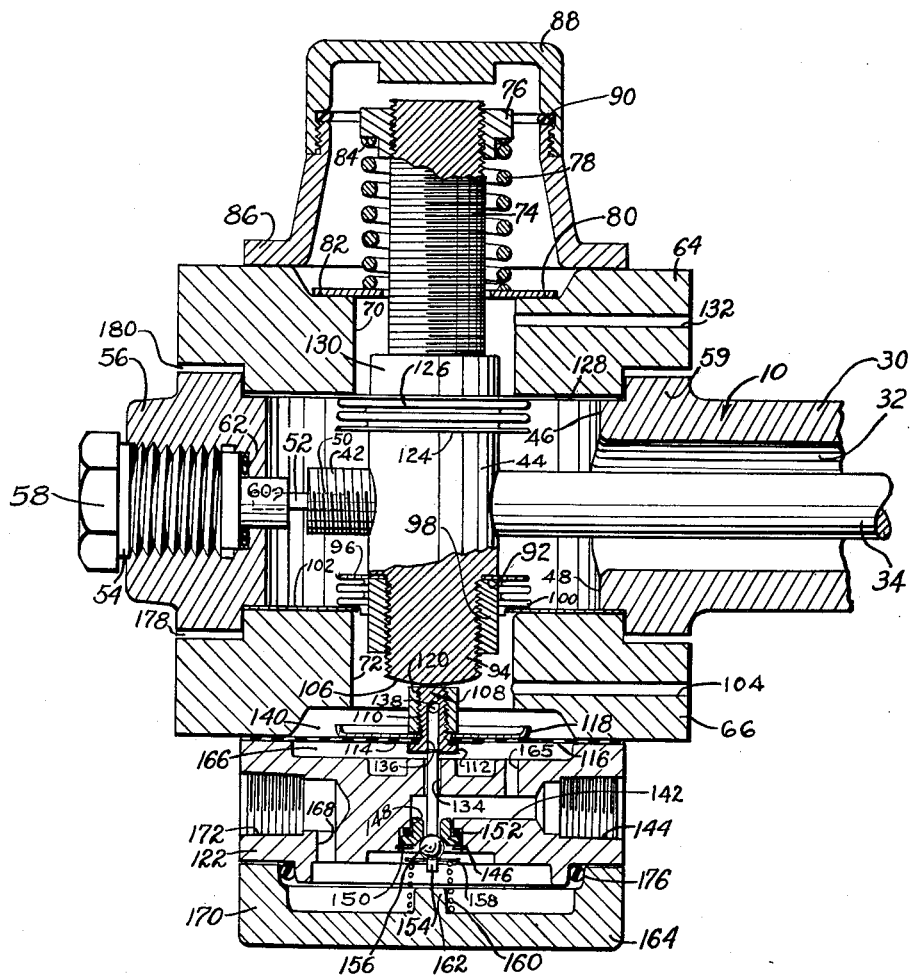
FIGURE 1 is a sectional elevational view of a portion of a level controller embodying the invention.

Referring to the drawings in detail, reference character 10 refers in general to a liquid level controller having a displacement element 12 suspended within a cylindrical housing 14. The housing 14 is provided with a pair of spaced equalizing apertures 16 and 18 which may be suitably secured to a vessel (not shown) whereby the interior chamber 19 of the housing 14 will be in communication with the interior of the vessel. An outwardly directed circumferential flange 20 is provided on the lower end of the housing 14, as viewed in FIG. 2, for receiving a cover plate 22. The cover plate 22 is removably secured to the flange 20 in any well known manner, such as the bolts 24, whereby access to the chamber 19 of the housing 14 is provided. A centrally disposed drain port 26 may be provided in the cover 22 for receiving a plug member 28 for draining of the chamber 19, as is well known.

A housing portion 30 extends perpendicularly from the housing 14, and is disposed at the upper end thereof as viewed in FIG. 2. The housing 30 is preferably integral with the housing 14, and is provided with an internal chamber 32 in communication with the chamber 19. A cantilever beam 34 extends longitudinally through the chamber 32 and is pivotally secured at 36 to a bifurcated yoke member 38 which in turn is threadedly secured at 40 to the upper end of the displacement element 12.

The opposite end 42 of the beam 34 is threaded to receive a spacer member 44 which is provided with a transverse threaded bore (not shown) for receiving the end 42 of the beam. The spacer member 44 is substantially perpendicularly disposed with respect to the beam 34 and extends outwardly therefrom in opposed directions, as shown in FIG. 1, through a pair of aligned transverse bores 46 and 48 provided in the housing 30, for a purpose as will be hereinafter set forth.

The end 42 of the beam 34 is provided with a longitudinally extending central bore 50 for receiving a pivot pin 52 therein. The pivot pin 52 is preferably loosely disposed within the bore 50. A centrally disposed threaded bore 54 extends longitudinally through the closed end 56 of the housing 30 for receiving a threaded stud or plug member 58. The inner end of the plug 58 is provided with a longitudinal central bore 60 for receiving the opposite end of the pivot pin 52, thus pivotally securing the beam 34 within the chamber 32. Alternatively, pivot pin 52 may be formed as an integral portion of the beam 34. A suitable sealing gasket 62 may be interposed between the plug 58 and an inwardly directed shoulder 62 provided in the housing 30 conterminous with the bore 54 for precluding leakage of fluid around the plug 58.

The housing 30 is preferably enlarged at 59 adjacent the bores 46 and 48 for receiving a pair of oppositely disposed discs or flange members 64 and 66. The flanges 64 and 66 are secured to the housing 30 adjacent the bores 46 and 48, respectively, by means of a plurality of spaced bolts 68, which preferably extend transversely through the flanges and the enlarged portion 59 for securely clamping the flanges to the housing. The flanges 64 and 66 are provided with central bores 70 and 72, respectively, in alignment with the bores 46 and 48 for receiving the spacer member 44 therethrough. The spacer member 44 is provided with an upwardly extending reduced stem portion 74 which is threaded to receive an adjusting nut 76. A helical spring 78 is disposed around the stem 74 and has one end anchored to an annular plate member 80 disposed in a recess 82 provided in the flange 64 conterminous with the bore 70. The opposite end of the spring 78 bears against an outwardly extending shoulder 84 provided on the adjusting nut 76. It will be apparent that the compression of the spring 78 may be adjusted by threadedly positioning the nut 76 on the stem 74 to provide substantially any desired force for the spring 78, for a purpose as will be hereinafter set forth.

A protector sleeve 86 having a removable cover 88 threadedly secured thereto may be secured to the flange 64 in any suitable manner (not shown) for protection of the stem 74. The cover 88 may be removed to provide access to the nut 76 for adjusting thereof or for any reason requiring access to the stem 74. It will be apparent that a sealing ring 90 may be interposed between the cover 88 and the sleeve 86 for precluding leakage of fluid therebetween.

The lower end of the spacer 44, as viewed in FIG. 1, is provided with an inwardly directed circumferential shoulder 92 providing a downwardly extending reduced stud member 94. An annular plate member 96 is disposed adjacent the shoulder 92. The stud 94 is threaded for receiving an internally threaded retaining sleeve 98 for securely clamping the washer or plate 96 to the shoulder 92. A bellows member 100 has one end thereof welded in any well known manner (not shown) to the washer 96, and the opposite end thereof is welded to an annular plate 102 which is disposed between the flange 66 and the enlarged portion 59 of the housing 30. The interior of the bellows 100 is open to the bore 72 of the flange 66, as clearly shown in FIG. 1. The flange 66 is provided with a transverse bore 104 extending from the bore 72 to atmosphere to communicate atmospheric pressure to the bore 72 and the interior of the bellows 100.

The lower end 106 of the stud 94 is rounded or of an arcuate configuration for contacting a relief valve 108. The relief valve 108 comprises a threaded stem 110 having an outwardly extending flange 112 provided at one end thereof for receiving an annular plate member 114. A flexible diaphragm 116 is disposed adjacent the plate 114 and a holder plate 118 is disposed thereabove as is well known. A threaded sleeve 120 is secured to the stem 110 for securely clamping the diaphragm 116 between the plates 118 and 114. The outer periphery of the diaphragm 116 is clamped between the flange 66 and an air relay valve body 122 as will be hereinafter set forth.

An annular plate member 124, similar to the plate 96, is disposed on the spacer 44 oppositely disposed from the plate 96 and is similarly secured thereto. A second bellows 126, substantially identical with the bellows 100, is welded, or the like, to the plate 124, and the opposite end thereof is welded to an annular plate 128, similar to the plate 102. The plate 128 is disposed between the flange 64 and the enlarged portion 59 of the housing 30. The plate 124 is secured to the spacer 44 by a retaining sleeve 130 threadedly disposed on the stem 74, in a similar manner to the sleeve 98. The interior of the bellows 126 is open to the bore 70. A transverse passageway 132 extends through the flange 64 from the bore 70 to atmosphere for communicating atmospheric pressure to the bore 70 and the interior of the bellows 126.

As hereinbefore set forth, the bellows 100 is substantially identical to the bellows 126. Thus, the area of the bellows 100 open to the area surrounding the balance beam 34 is equal to the area of the bellows 126 open thereto. In this manner, the internal pressure within the housing 30 cannot affect the balance of the level controller unit 10.

The air relay valve body 122 is provided with a central bore or passageway 134 which is disposed in alignment with a central bore 136 provided in the valve stem 110. The bore 136 extends into communication with a radial bore 138, which provides communication between the bore 136 and the chamber 140 above the diaphragm 116. A radial passageway 142 is provided in the body 122 and extends from the bore 134 to an enlarged threaded portion 144 which receives a suitable fitting (not shown) for a purpose as will be hereinafter set forth. The passageway 142 also provides communication between the bore 134 and a valve seat member 146 which is disposed in a bore 148 in alignment with the bore 134. The valve seat 146 may be secured within the bore 148 in any suitable manner, such as a lock washer 150, and an O-ring or suitable sealing member 152 is preferably interposed between the valve seat 146 and the body 122 to preclude leakage of fluid therebetween.

A valve core 154 is loosely disposed in the valve seat 146 and extends upwardly through the bore 134 for a purpose as will be hereinafter set forth. The valve core 154 is provided with a substantially spherical portion 156 adjacent the lower end thereof for limiting the movement of the core member in one direction and to cooperate with the valve seat member 146 for closing the valve in a raised position of the core member 154. An annular disc 158 is secured to the valve core 154 below the spherical portion 156 for receiving one end of a helical spring 160 thereagainst. The spring 160 is disposed around an upwardly extending boss 162 provided in a sump body member 164 which is secured below the valve body 122, as viewed in FIG. 1. The spring 160 constantly urges the valve core 154 in an upwardly direction for closing the valve seat 146 as well as the valve stem 110, thus precluding a flow of fluid through the valve seat and valve stem in the balanced or normal position of the level control unit 10.

A passageway 165 is provided in the body 122 for communication between the passageway 142 and the chamber 166 below the diaphragm 116. A similar passageway 168 is provided in the body 122 to provide communication between the sump chamber 170 below the valve seat 146 and a radial bore 172 oppositely disposed from the bore 144. The bore 172 is threaded for receiving a suitable fitting (not shown) for a purpose as will be hereinafter set forth.

The sump body 164 and the valve body 122 are preferably secured to the flange 66 by means of a plurality of spaced bolts 174 (FIG. 4). A sealing gasket 176 may be interposed between the sump body 164 and the valve body 122 for precluding leakage of fluid therebetween. It will be noted in FIG. 1 that the flanges 64 and 66 are provided with a clearance, as at 178 and 180, between the flanges and the enlarged portion 59 of the housing 30. This is to assure that the flanges may be securely clamped on the housing 30 by the bolts 68 with no interference between the flanges and the housing.

*Operation*

The liquid level control apparatus 10 may be secured to a fluid containing vessel (not shown) in any well known manner whereby the parts 16 and 18 are in communication with the interior of the vessel. In this manner, the fluid within the vessel will fill the chamber 19 and the level of the fluid in the chamber 19 will tend to remain the same as the level of the fluid within the vessel, as is well known.

The threaded bore 172 may be provided with a suitable fitting (not shown) for transmitting pressure regulated air, or the like, into the sump chamber 170 from an independent source (not shown). Similarly, the threaded bore 144 may be provided with a suitable connection member (not shown) for transmitting air, or the like, from the passageway 142 to a controlling device, such as a valve for admitting fluid into the vessel, or a recording device, or other indicating apparatus, depending upon the utilization environment of the level control apparatus 10.

In the application depicted herein, it is preferable to adjust the nut 76 in such a manner that the compression in the spring exerts an upward force on the balance beam 34 to exactly hold the weight of the fully submerged displacement element 12 when the pressure in the chamber 166 is equal to atmospheric pressure. Thus, the beam 34 will be disposed in a substantially horizontal position, as depicted in the drawings, when the fluid level within the chamber 19 is such that the displacement element is fully submerged therein. With the beam in the horizontal position, the opposed seal units 100 and 126 will be equally balanced since both bellows are subjected to equal and opposite pressures.

As the fluid level drops within the chamber 19, the weight of the displacement element 12 increases because of the decreased buoyancy thereof. The increase in weight of the displacement element tends to pivot the beam 34 in a clockwise direction and very slightly bend the pivot member 52 is a cantilever action, thus lowering the spacer member 44 within the chamber 32. The arcuate surface 106, which is in contact with the relief valve 108, lowers the valve to provide a downward flexing of the diaphragm 116. Simultaneously, the valve core 154 is moved downwardly within the bore 134 and the spherical portion 156 moves away from the valve seat 146. It will be apparent that a very slight movement of the valve core 154 is necessary for opening of the valve 146.

The gas present in the chamber 170 will flow through the open valve 146 and into the passageway 142. A portion of this fluid in the passageway 142 will be diverted to the chamber 166 through the passageway 165 equalizing the pressure therein with the pressure in the passageway 142. The greater portion of the fluid, however, will be transmitted through the bore 144 to the indicating device (not shown) or other controlling device being actuated by the level control apparatus 10. The pressure in the chamber 166 is constantly trying to balance the forces on the beam 34 and tends to raise the diaphragm 116 to the normally horizontal position. The fluid will continue to flow through the open valve 146 and the bore 144 until the pressure in the passageway 142 and the chamber 166 increases to the point of exerting a pressure on the diaphragm 116 for an upward force on the beam 34 sufficient for counter-balancing the decreased buoyancy of the displacement element. When this pressure or force balance is reached, the diaphragm 116 is disposed in the normally horizontal position. As the diaphragm 116 is raised to the horizontal position, the spring 160 urges the valve core 154 and attendant spherical portion 156 upwardly to close the valve 146, essentially trapping the fluid in the passageway 142 and chamber 166 and holding this pressure.

Conversely, as the fluid level rises within the chamber 19, the weight of the displacement element 12 is lessened, and the change in weight of the displacement element in combination with the pressure in the chamber 166 acting on the lower site of the diaphragm 116 will pivot the beam 34 in a counter-clockwise direction and raise the spacer 44 for permitting the excess pressure in the chamber 166 to flex the diaphragm 116 upwardly whereby the valve 108 is raised away from the core 154. The pressure fluid in the chamber 166 will then escape through the bores 136 and 138 to the chamber 140 and discharge to atmosphere through the bore 104. When the pressure in the chamber 166 decreases to a point where it will only exert a force necessary to balance the lessened weight of the displacement element, the diaphragm 116 will return to the normal horizontal position and the beam 34 has found a new balance and this pressure in chamber 166 will be equal to the pressure transmitted from passageway 142 to the indicating or controlling device.

The area and level ratios are so designed that when the fluid level in the chamber 19 falls below the extreme or lower end of the displacement element 12, the output from the air relay passageway 142 will be equal to the full regulated supply pressure fluid entering through the port 172. Thus, as a level indicator, one hundred per cent of the displacement element can be used.

The operation of the apparatus 10 hereinbefore set forth discloses an application wherein the output pressure of the apparatus increases upon a falling or lowering of the liquid level in the vessel. However, by rearranging these same parts, this action may be reversed whereby the output signal pressure increases upon rising of the liquid level. In addition, it is to be noted that a float member of any well known type (not shown) may be utilized in lieu of the displacement element 12. Furthermore, it will be apparent that a more sensitive type of air relay valve may be utilized with the apparatus 10 in lieu of the air relay body 122, and the invention is in no way limited to the valve arrangement depicted herein.

From the foregoing, it will be apparent that the present invention provides a novel liquid level control apparatus wherein a balanced beam structure is utilized in order to eliminate the translation of linear movement to rotational motion. The force balance principle requires a very slight movement of the double seal units for actuation of the air relay valve. In addition, the double seal unit provides equal areas open to the internal pressure of the apparatus, thus assuring that pressure changes therein will not affect the balance of the system. The novel control apparatus is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A liquid level controller comprising a movable displacement element, a horizontally disposed cantilever beam pivotally secured to the displacement element, means interposed between the displacement element and pivot point of the beam for applying force to the cantilever beam for balancing thereof, and means responsive to movement of the cantilever beam toward an unbalanced position for returning the cantilever beam to the balanced position.

2. A liquid level controller comprising a housing, a movable displacement element responsive to liquid level changes, a horizontally disposed cantilever beam pivotally secured to the displacement element at a pivot point, seal means secured between the housing and the cantilever beam through which a force may be applied for balancing of the beam, said seal means interposed between the displacement element and the pivot point of the beam and remotely disposed from the liquid, and means responsive to movement of the beam toward an unbalanced position to return the beam to a balanced position.

3. A liquid level controller comprising a housing, a cantilever beam pivotally secured within the housing, a displacement element pivotally secured to the cantilever beam and responsive to liquid level changes for pivoting the cantilever beam, seal means secured between the housing and the cantilever beam through which a force may be applied for balancing of the beam, said seal means remotely disposed from the liquid, and means responsive to movement of the beam toward an unbalanced position to return the beam to a balanced position.

4. A liquid level controller comprising a housing, a cantilever beam pivotally disposed within the housing, a displacement element pivotally secured to one end of the cantilever beam and responsive to liquid level variances for pivoting the cantilever beam about a pivot point toward an unbalanced position, equal and opposite seal members secured between the housing and the beam through which a force may be applied, said seal members interposed between the displacement element and the pivot point of the beam and remotely disposed from the liquid, diaphragm means in communication with the beam, and valve means responsive to the pivoting of the beam for actuating the diaphragm means for returning the beam to the balanced position.

5. A liquid level controller comprising a housing, a cantilever beam disposed within the housing and pivotally supported at one end thereof, a displacement element pivotally secured to the cantilever beam and responsive to liquid level variances for pivoting the beam toward an unbalanced position, a first bellows member secured between the housing and the beam, a second bellows member secured between the housing and the beam, said bellows members remotely disposed from the liquid and open to equal pressures whereby a force may be applied for balancing of the beam, diaphragm means in communication with the beam, and valve means for actuating the diaphragm means upon pivoting of the beam for returning the cantilever beam to the balanced position upon pivoting thereof by the displacement element.

6. A liquid level controller comprising a housing, a cantilever beam pivotally disposed within the housing, a displacement element pivotally secured to the beam and responsive to liquid level variances for pivoting the beam toward an unbalanced position, a first bellows member secured between the housing and the beam, a second bellows member secured between the housing and the beam, said bellows members subjected to equal pressures whereby a force may be applied for balancing of the beam, said bellows members remotely disposed with respect to the liquid, a flexible diaphragm member in association with the beam, a valve carried by said diaphragm member, a second valve cooperating with the first valve and diaphragm upon pivoting of the cantilever beam toward an unbalanced position for returning the beam to a balanced position.

7. A liquid level controller comprising a housing having a liquid chamber, a displacement element disposed in the liquid within the liquid chamber, a cantilever beam pivotally secured to the displacement element at one end thereof, said displacement element responsive to liquid level variations for pivoting the cantilever beam toward an unbalanced position, seal means secured between the housing and the beam whereby a force may be applied for balancing of the beam, said seal means remotely disposed with respect to the liquid, diaphragm means, and valve means actuated by a member carried by the beam upon pivoting of the beam toward an unbalanced position to actuate the diaphragm means for returning the beam to a balanced position.

8. A liquid level controller comprising a housing having a liquid chamber, a displacement element disposed in the liquid within the chamber, a cantilever beam pivotally secured to the displacement element, said displacement element responsive to liquid level variances for pivoting the beam toward an unbalanced position, seal means secured between the housing and the beam through which a force may be applied for balancing of the beam, a diaphragm flexed in one direction by a member carried by the beam upon movement of the cantilever beam toward an unbalanced position, said seal means remotely disposed with respect to the liquid, and valve means actuated by the flexing of the diaphragm for admitting pressure fluid to one side of the diaphragm for flexing the diaphragm in an opposite direction from said first direction for cooperation with said member to return the beam to a balanced position.

References Cited in the file of this patent

UNITED STATES PATENTS

| | | |
|---|---|---|
| 2,416,570 | Coleman | Feb. 25, 1947 |
| 2,669,129 | Williams | Feb. 16, 1954 |
| 2,753,885 | White | July 10, 1956 |
| 2,898,929 | Williams | Aug. 11, 1959 |

FOREIGN PATENTS

| | | |
|---|---|---|
| 859,120 | France | May 27, 1940 |